(12) United States Patent
Li et al.

(10) Patent No.: US 10,838,140 B2
(45) Date of Patent: Nov. 17, 2020

(54) POLARIZATION MAINTAINING OPTICAL FIBER

(71) Applicant: Corning Incorporated, Corning, NY (US)

(72) Inventors: Ming-Jun Li, Horseheads, NY (US); Jeffery Scott Stone, Addison, NY (US)

(73) Assignee: Corning Incorporated, Corning, OH (US)

( * ) Notice: Subject to any disclaimer, the term of this patent is extended or adjusted under 35 U.S.C. 154(b) by 0 days.

(21) Appl. No.: 15/071,505

(22) Filed: Mar. 16, 2016

(65) Prior Publication Data

US 2016/0274299 A1 Sep. 22, 2016

Related U.S. Application Data

(60) Provisional application No. 62/135,962, filed on Mar. 20, 2015.

(51) Int. Cl.
G02B 6/024 (2006.01)

(52) U.S. Cl.
CPC .......... *G02B 6/024* (2013.01); *C03B 2201/06* (2013.01); *C03B 2201/08* (2013.01)

(58) Field of Classification Search
CPC ........... C03B 37/01211; C03B 2201/14; C03B 2201/06; C03B 2201/08; G02B 6/24; G02B 6/105
See application file for complete search history.

(56) References Cited

U.S. PATENT DOCUMENTS

| 7,697,809 | B2 * | 4/2010 | Bookbinder | G02B 6/024 385/11 |
| 8,000,575 | B2 | 8/2011 | Chen et al. | |
| 2002/0144521 | A1 * | 10/2002 | Orcel | C03B 37/01205 65/391 |
| 2005/0008311 | A1 * | 1/2005 | Farroni | C03B 37/01217 385/123 |
| 2007/0177846 | A1 * | 8/2007 | Chen | C03B 37/01217 385/125 |
| 2009/0060435 | A1 | 3/2009 | Chen et al. | |
| 2009/0080843 | A1 | 3/2009 | Bookbinder et al. | |
| 2011/0268399 | A1 * | 11/2011 | Berkey | C03B 37/01217 385/107 |

OTHER PUBLICATIONS

Bachmann et al., Thermal expansion coefficients of doped and undoped silica prepared by means of PCVD, 1988, Journal of Materials Science, vol. 23, pp. 2584-2588.*
International Search Report and Written Opinion PCT/US2016/22446 dated May 26, 2016.

* cited by examiner

*Primary Examiner* — Ryan A Lepisto
*Assistant Examiner* — Erin D Chiem
(74) *Attorney, Agent, or Firm* — Smit Kapadia

(57) ABSTRACT

An optical fiber, comprising: (i) a core, (ii) a cladding surrounding the core, (iii) at least one stress member adjacent the fiber core and situated within the cladding, said stress member comprising silica doped with F.

19 Claims, 4 Drawing Sheets

POLARIZATION MAINTAINING OPTICAL FIBER

This application claims the benefit of priority under 35 U.S.C. § 119 of U.S. Provisional Application Ser. No. 62/135,962 filed on Mar. 20, 2015, the content of which is relied upon and incorporated herein by reference in its entirety.

BACKGROUND OF THE INVENTION

Field of the Invention

The present invention relates generally to optical fiber, and more particularly to a polarization maintaining optical fiber.

Technical Background

Polarization maintaining (PM) optical fibers are useful for ultra-high speed transmission systems and many other applications. One type of prior polarization maintaining fiber includes, as shown in FIG. 1, a central core 10 surrounded by a cladding 11. Core 10 and cladding 11 are formed of conventional materials employed in the formation of optical waveguides. The refractive index of the core material is greater than that of the cladding material. By way of example only, core 10 may be comprised of silica containing one or more dopants which increase the refractive index thereof, such as germania. Cladding 11 may comprise pure silica, silica containing a lesser amount of dopant than core 10, or silica containing one or more down dopants, at least one of which is an oxide of an element such as boron or fluorine which lowers the refractive index of silica. In FIG. 1, diametrically opposed relative to core 10, are two regions 12 (stress inducing rods) formed of a glass silica doped boron (e.g., with 20 to 25 wt % B) having a coefficient of thermal expansion (CTE) different from that of cladding material 11. When such a fiber is drawn, the longitudinally-extending regions 12 and the cladding regions will shrink different amounts whereby regions 12 will be put into a state of tension or compression depending upon the CTE thereof relative to that of the cladding 11. A strain induced birefringence, which is thus induced by anisotropic thermal stress which results from the mismatch of CTEs between regions 12 and the surrounding regions 11, reduces coupling between the two polarized fundamental modes (with orthogonal polarization directions).

One major drawback of these PM attained through the CTE mismatch (between the cladding 11 and regions 12), is that these fibers are temperature-sensitive due to the fact that the thermal stress changes with temperature. This thermal sensitivity often compromises the stability of the PM performance. Thermal stability of PM fibers is very important for many applications, such as in high-power amps/lasers, high-precision airborne space navigation, and deep-sea (or land) sensor applications, where the fiber can experience dramatic temperature changes during operation. These changes can result in PM characteristic degradation causing deterioration in performance, low navigational accuracy, and possibly a total failure in the device/system if additional, often costly, temperature management is not employed.

SUMMARY OF THE INVENTION

Some embodiments of the present invention relate to an optical fiber comprising: (i) a core, (ii) a cladding surrounding the core, and (iii) at least one stress member adjacent the fiber core and situated within the cladding, the stress member comprising F doped silica with 0 to 1 wt % of B.

Preferably the at least one stress member comprises 0 to 0.5 wt % of B. According to some exemplary embodiments the amount of B in the at least one stress member is less than 0.05 wt %. In some embodiments the at least one stress member includes less than 0.01 wt % B. In some embodiments the at least one stress member includes no B. Preferably the amount of F in the at least one stress member is 1 wt % or greater. According to some embodiments the at least one stress member has 1.5 wt %<F<3.5 wt %. Preferably, the optical fiber supports polarization maintenance within an operating wavelength range of 800 nm to 1600 nm (e.g., 850 nm, 1060 nm, 1310 nm, and/or 1550 nm). Preferably the stress member has thermal stress coefficient $\sigma_t$ and mechanical stress coefficient $\sigma_m$, and $\sigma_t<0.1\sigma_m$. Preferably the optical fiber has birefringence of greater than $5\times10^{-5}$ (e.g., $1\times10^{-4}$ to $1\times10^{-3}$).

In one embodiment, the central core is surrounded by this stress member and the stress member is an annular region of fluorine doped silica. In another embodiment, the stress member includes at least two stress-applying parts (SAPs) (e.g., F doped stress rods with 0 to 1 wt % B) situated on opposite sides of the core.

In accordance with some embodiments of the invention, the central core preferably has a delta %, $\Delta_1$, of between about 0.2% and 2.5%. In single-mode fibers for use in telecommunications and fiber sensors, the central core delta %, $\Delta_1$ is preferably of between about 0.3% to 2.5%. Some fiber embodiments disclosed herein are, for example, single-mode fibers with core diameters of about 3 to 12 microns.

One advantage of the polarization maintaining fibers according to the embodiments of the present invention is substantially stable polarization maintaining performance which has no, or minimal temperature sensitivity.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

DETAILED DESCRIPTION OF THE PREFERRED EMBODIMENTS

Figure 1:
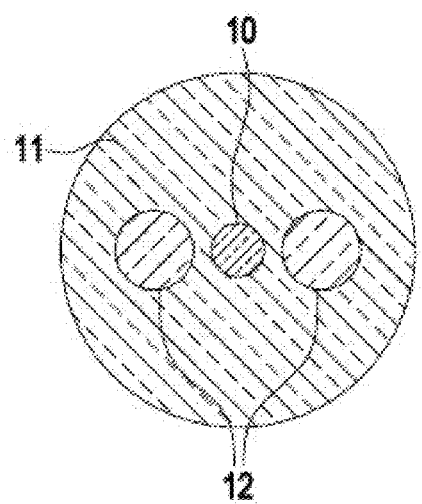
FIG. 1 is a schematic cross-sectional view of an optical waveguide of the prior art.

For purposes of the description herein, it is to be understood that the invention may assume various alternative configurations and step sequences, except where expressly specified to the contrary. It is also to be understood that the specific fibers and process steps illustrated in the attached drawings, and described in the following specification are exemplary embodiments of the inventive concepts defined in the appended claims. Hence, specific dimensions and other physical characteristics relating to the embodiments disclosed herein are not to be considered as limiting.

Definitions: The following definitions and terminology are commonly used in the art.

Refractive index profile—the refractive index profile is the relationship between the refractive index (Δ%) and the optical fiber radius (as measured from the centerline of the optical fiber) over a selected segment of the fiber.

Relative refractive index percent Δ%—the term Δ% represents a relative measure of refractive index defined by the equation:

$$\Delta\% = 100 \times (n_i^2 - n_c^2)/2n_i^2$$

where $n_i$ is the maximum refractive index of the index profile segment denoted as i, and $n_c$, the reference refractive index. Every point in the segment has an associated relative index measured relative to the reference refractive index.

The optical waveguide fiber 20 in accordance with the embodiments of the present invention is a thermally stable PM fiber that utilizes one or more stress applying part(s) (herein referred to as a stress member) doped with F and less than 1 wt % of B. According to some embodiments the stress member comprises less than 0.5 wt % of B (boron). According to some embodiments the stress member comprises less than 0.1 wt % of B (boron). According to some embodiments the stress member(s) includes essentially no B. Applicants discovered that PM fibers with no boron (B), or with minimal amount of B have advantages over the PM fibers that includes a significant amount of B (e.g., ≥2 wt %). These stress member(s) may have circular or non circular cross-sections, and may be utilized in many different types of fibers, for example: active (e.g., rare earth doped core) and passive fibers, and fibers that have one or more claddings of different materials (e.g., double clad fibers). Such optical fibers 20 provide polarization maintenance property via mechanical-stress, rather than thermal-stress seen in the traditional polarization maintaining PM fibers with B-only-doped silica as the SAPs (thermal stress-applying-part(s)). The mechanical stress achieved in the embodiments of the polarization maintaining (PM) optical fiber 20 is temperature-insensitive up to the strain-point of the F-doped-silica (material used for stress member(s)). Thus, optical fiber 20 is advantageously a very thermally stable PM-fiber. According to the embodiments described herein temperature-insensitive fiber PM 20 has (or exhibits) over the temperature range of −60° C. to +120° C.:

1) changes in birefringence of the fiber Δn (refractive index difference between two polarization modes at the wavelength λ) of less than 10%, preferably less than 5%, and even more preferably less than 3% (but >0%); and/or 2) changes in beat length $L_b$ (where $L_b \lambda/(2\pi)\Delta n$) of less than 10%, preferably less than 5%, and even more preferably less than 3% (but >0%), where λ is the operating wavelength (e.g., 850 nm, 1060 nm, 1310 nm, and/or 1550 nm). It is noted that Lb can be measured by the wavelength scanning method, where the measured beat length $L_b = (\Delta\lambda/\lambda)L$ where Δλ is the peak to peak wavelength, λ is the average wavelength, and L is the length of the measured fiber.

Figure 2A:
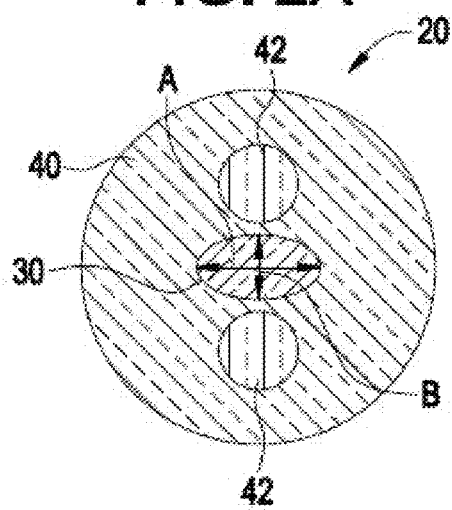
FIG. 2A is a schematic cross-sectional view of a first embodiment of the polarization maintaining optical fiber in accordance with the present invention.
Figure 2B:
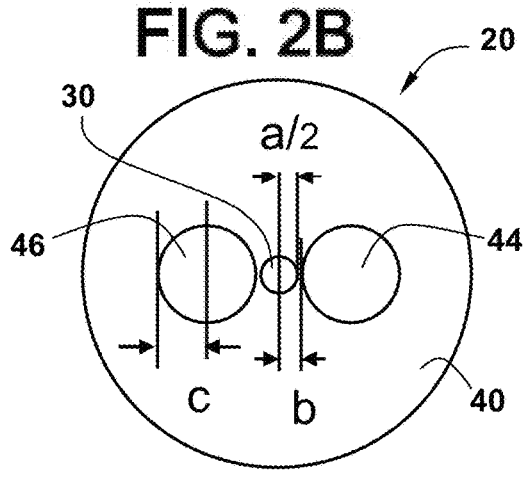
FIG. 2B is a partial schematic cross-sectional view of a second embodiment of the polarization maintaining (PM) optical fiber in accordance with the present invention.

Two embodiments of the polarization maintaining optical waveguide fiber 20 in accordance with the invention described and disclosed herein have a cross-sectional structure, as best shown in FIGS. 2A and 2B. In the illustrated embodiments, the optical waveguide fiber 20 includes a center core 30 extending along the longitudinal axis of the fiber. This core 30 may be either (i) circular (as shown in FIG. 2B), with typical diameters between 3 and 12 microns, or (ii) elongated (e.g. elliptical, as shown in FIG. 2A) with a maximum dimension, A, and a minimum dimension, B. If the core 30 is elongated, it is preferable that the core 30 of the fiber 20 exhibits a first aspect ratio, AR1, defined as A/B, of greater than 1.5; preferably between about 1.5 and 8; more preferably between 2 and 5. The core 30 is surrounded by fiber cladding 40 which includes and/or surrounds at least one stress member 42.

Central core 30 is manufactured, for example, from germania-doped silica, wherein germania is provided in a sufficient amount such that the core exhibits a core delta %, $\Delta_1$, between about 0.2% and 2.5% ($GeO_2$ doping between about 3.6 wt % and 44 wt %); for example preferably between about 0.3% and 1% % ($GeO_2$ doping level between about 5.4 wt % to 18 wt %); for example 0.3% to 0.5% ($GeO_2$ doping level between about 5.4 wt % to 9 wt %), and in one embodiment about 0.34% ($GeO_2$ doping level about 6.2 wt %). If the core is elongated, an average diameter, d avg={A+B}/2, of the core 30 is preferably between about 3 and 12 microns; more preferably between 4 and 10 microns.

Figure 2C:
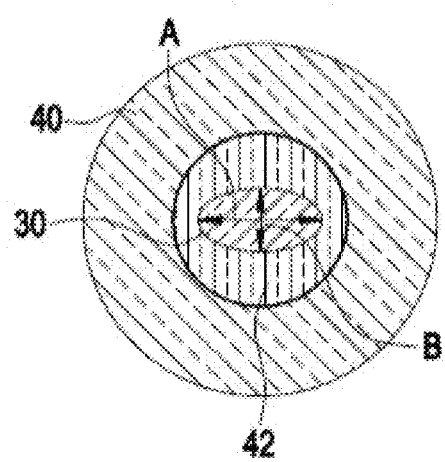
FIG. 2C is a schematic cross-sectional view of a third embodiment of the polarization maintaining optical fiber in accordance with the present invention.

The at least one stress member is formed adjacent to the core 30 or in contact with the core (FIGS. 2A-2D). For example, FIG. 2C illustrates a stress member 42 that is an annular region of fluorine doped silica surrounding the core. If the annular stress member 42 surrounds the core, the annular stress region may be circular (FIG. 2C), or oval (not shown). A bow-tie-geometry stress member 42 surrounding the core (not shown) may also be utilized. Preferably, the amount of F in the stress member 42 is at least 1 wt %, for example 1-4 wt % (e.g., 1.5 wt %<F<3.5 wt %), and the amount of B in the stress member is 0 to 1 wt % (e.g., <0.5 wt %, or <0.2 wt %, or <0.1 wt % or even <0.05 wt %).

Figure 2D:
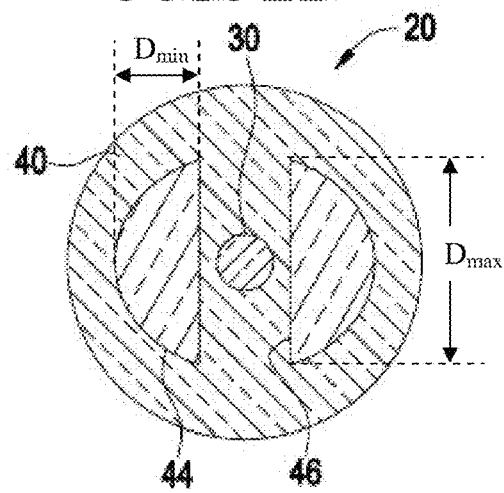
FIG. 2D is a schematic cross-sectional view of a fourth embodiment of the polarization maintaining optical fiber in accordance with the present invention.

The stress member(s) 42 may be a plurality of F doped stress rods 44, 46 (see, for example, FIGS. 2A, 2B, 2D, 4A and 4B) Preferably the amount of F in the stress rods is at least 1 wt %, for example 1-4 wt % (e.g., 1.5 wt %<F<3.5 wt %). These fluorine doped stress rods comprise less than 1 wt % of boron. According to some embodiments the stress rods 44, 46 comprise less than 0.5 wt % of boron, for example <0.2 wt %, or even <0.1 wt %, or <0.05 wt % of Boron. According to some embodiments the stress rods 44, 46 comprise less than 0.01 wt % of boron (i.e., 0 to 0.1 wt % B). According to some embodiments the stress rods include essentially no B. In some embodiments the stress rods 44, 46 contain no Boron. More specifically, FIGS. 2A, 2B and 2D illustrate stress members that include at least two stress rods 44, 46 situated on opposite sides of the core 30. If the fiber 20 includes the annular region 32, the stress rods 44, 46 may be formed, at least in a part, in the annular region 32 of the fiber 20. The stress rods 44, 46 preferably extend along the entire longitudinal length of the fiber 20, and are preferably of substantially constant dimension along the fiber length. The stress rods 44, 46 are preferably positioned on diametrically opposite sides of the center core 30 and may be situated in the cladding 40 as shown in FIG. 2A, 2B, or 2D. The stress rods 44, 46 may be positioned adjacent to, and aligned with, the minimum core dimension B. The wall-to wall distance between the core and the stress rods can be zero (stress rods touching the core). Preferably the stress member, such as the stress rods 44, 46 are situated adjacent to and in very close proximity to the core 30 (for example, having a stress rod's edge located within 10 microns and preferably within 2-5 or 3-5 microns from the edge of core 30). The stress rod cross-section may be circular (FIG. 2A), but may optionally be of other shapes (see, for example, FIG. 2D and FIGS. 4A and 4B) and may be of equal or non-equal size. In optical fibers 20 designed for standard single mode applications (e.g., fibers with outer diameter (OD) of 125 μm, the stress member(s) preferably have a maximum dimension, such as in diameter d or width w of between about 5 to 40 microns; more preferably between about 10 μm and 30 microns, for example 10 to 25 microns or 10 to 20 microns. According to some embodiments the stress rods have cross-section with an average diameter $d_{av}$, wherein 10 μm≤$d_{av}$≤40 μm. ($d_{av}=\frac{1}{2}(D_{max}+D_{min})$) Although in these figures only one stress rod is shown on each side of the core 30, multiple rods along each side may also provide PM within an operating wavelength band. An exemplary stress member comprising F doped silica may include 1.5 wt %<F<3.5 wt % and 0 to 0.1 wt % B. For example, in some embodiments the stress member may include 2.4 wt %<F<3 wt % and 0 to 0.05 wt % B. In some exemplary embodiments the amount of Boron in stress rods 42, 46 is between 0 to 0.01 wt %. The stress member(s) preferably have CTE which is similar to that of pure silica (or its surrounding doped-silica material) to secure a temperature insensitive PM performance within a temperature range of −100° C. to 600° C. For example, the stress member(s) has a CTE preferably between $1 \times 10^{-7}$/° C. and $10 \times 10^{-7}$/° C., and more preferably between $2 \times 10^{-7}$/° C. and $5 \times 10^{-7}$/° C. In some embodiments the stress member (e.g., stress rods) has/have CTE of $3 \times 10^{-7}$/° C. to $5 \times 10^{-7}$/° C. within a temperature range of −100° C. to 600° C.

Preferably, the optical fiber 20 supports polarization maintenance within an operating wavelength range situated between 800 nm and 1600 nm (e.g., 850 nm, 1060 nm, 1310 nm, and/or 1550 nm). The optical fibers 20 according to some embodiments of the present invention exhibit birefringence (measured as Δn) of $0.4 \times 10^{-4}$ to $1 \times 10^{-3}$ (e.g., $5 \times 10^{-4}$ to $1 \times 10^{-3}$) at a wavelength situated within the 450 nm to 1600 nm band. In some embodiments the polarization maintaining fiber is a single mode fiber exhibiting birefringence of $0.4 \times 10^{-4}$ to $10 \times 10^{-4}$ at a wavelength of 450 nm to 1600 nm (e.g., at 1310 nm or 1550 nm). For example, the birefringence Δn may be between $1 \times 10^{-4}$ to $3 \times 10^{-4}$ at a wavelength of 1550 nm.

Figure 3:
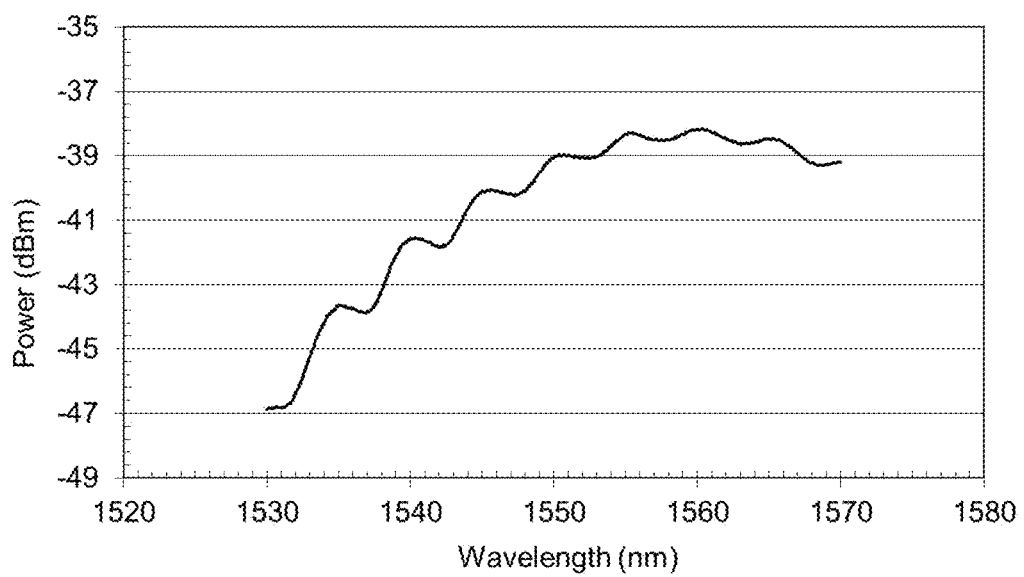
FIG. 3 is a plot measured by OSA (optical spectrum analyzer) showing the spectrum (transmitted power in dBm units) vs. wavelength of the optical fiber of FIG. 2A.

FIG. 3 shows the measured OSA spectrum vs. wavelength when the fiber of FIG. 2A is positioned between a pair of cross polarizers. Both birefringence (Δn) and beat length of this exemplary PM fiber (fiber of FIG. 2A) can be calculated by information provided in FIG. 3. This fiber has a measured beat length $L_b = (\Delta\lambda/\lambda)L$ of about 1.66 mm at 1550 nm, where Δλ is the peak to peak wavelength spacing in FIG. 3, λ is the average wavelength, and L is the length of the measured fiber (In this embodiment L=0.52 m). The fiber has birefringence Δn of about $9.3 \times 10^{-4}$ at λ=1550 nm, which is similar to that achievable in conventional PM fibers with B-only-doped-silica as stress member, but with the added benefit of being thermally-stable up to the strain-point (about 650° C.) for the F-silica glass.

One exemplary fiber 20 with a cross-section similar to that shown FIG. 2A has a single mode core (in this embodiment the core is circular) with relative refractive index delta of 0.34% and pure silica cladding. Thus, effective core-delta of 0.34% of the core relative to the cladding corresponds to a core NA of about 0.12 in this PM fiber design. The stress rods have a delta of −0.45% (also relative to pure silica). This fiber embodiment has a core diameter of about 4.5 μm, and stress rod diameters of about 20-25 μm. The stress rods 44, 46 are situated within the cladding 40, adjacent to the core 30, with the distance (wall-to-wall, or edge-to-edge) between the core 30 and the stress rods 44, 46 of about 5 μm. This fiber 20 has a birefringence of $9.3 \times 10^{-4}$ at λ=1.55 μm. The fiber core 30 of this exemplary fiber comprises less than 7 wt % of $GeO_2$. The cladding 40 of this exemplary fiber embodiment is comprised essentially of pure silica. The stress rods 44, 46 of this exemplary fiber comprise silica doped with 2.5 wt. % of F and less than 0.1 wt % of boron (e.g., essentially no boron).

According to some embodiments the radius of the stress rods is larger than the (edge to edge) distance between the core 30 and the stress rod 44 or 46 (See, for example, FIG. 2B where c>(b-a/2). Preferably, the edge to edge distance between the core 30 and the stress rod 44 or 46 is smaller than the diameter of the core. For example, as shown in FIG. 2B the diameter of the core is a, and the distance between the core and the stress rods is b-a/2. This figure illustrates that (b-a/2) is less than a. In some embodiments the distance between the core edge and the edge of the stress rod(s) is less than 3 μm, and in some embodiments less than 2 μm. Also, see for example FIGS. 4A and 4B.

According to one embodiment, we manufactured a polarization maintaining (PM) fiber 20 with Fluorine doped stress rods that have essentially no boron as follows:

A silica soot blank with 5000 g silica soot was prepared first by the outside vapor deposition (OVD) process. The post laydown soot density was 0.541 g/cm³. The diameter of the soot blank was 122 mm. A 30 cm long section of the soot blank was cut off. To provide adequate mechanical strength for drilling holes in the following step, the soot blank (in this embodiment 30 cm long) was pre-sintered at 1270° C. for 3 hours in helium atmosphere to increase the density to about than 1.0 g/cm³. After pre-sintering, the pre-sintered soot blank was drilled to provide a total of 3 holes—a central hole 9 mm in diameter and two holes with 18 mm in diameter on two sides of the central hole. A glass core cane of 8.5 mm was inserted into the central hole, and two Fluorine doped glass canes of 18 mm in diameter were inserted into the side holes. The core cane was made of Ge doped glass with delta of 0.34% (relative to pure silica) and a thin pure silica cladding surrounding the core region. The core/clad ratio (core diameter over cane diameter) was 0.975. The fluorine doped rods had delta of −0.45% relative to pure silica, which corresponds to Fluorine concentration of 1.62 wt % and contained essentially no boron. Then the soot blank with the core cane and Fluorine doped rods was sintered in a furnace to form a sintered glass preform. The sintered glass preform was drawn into fibers of 125 μm and 100 μm diameters using a draw tower with 200 g draw tension.

Figure 4A:
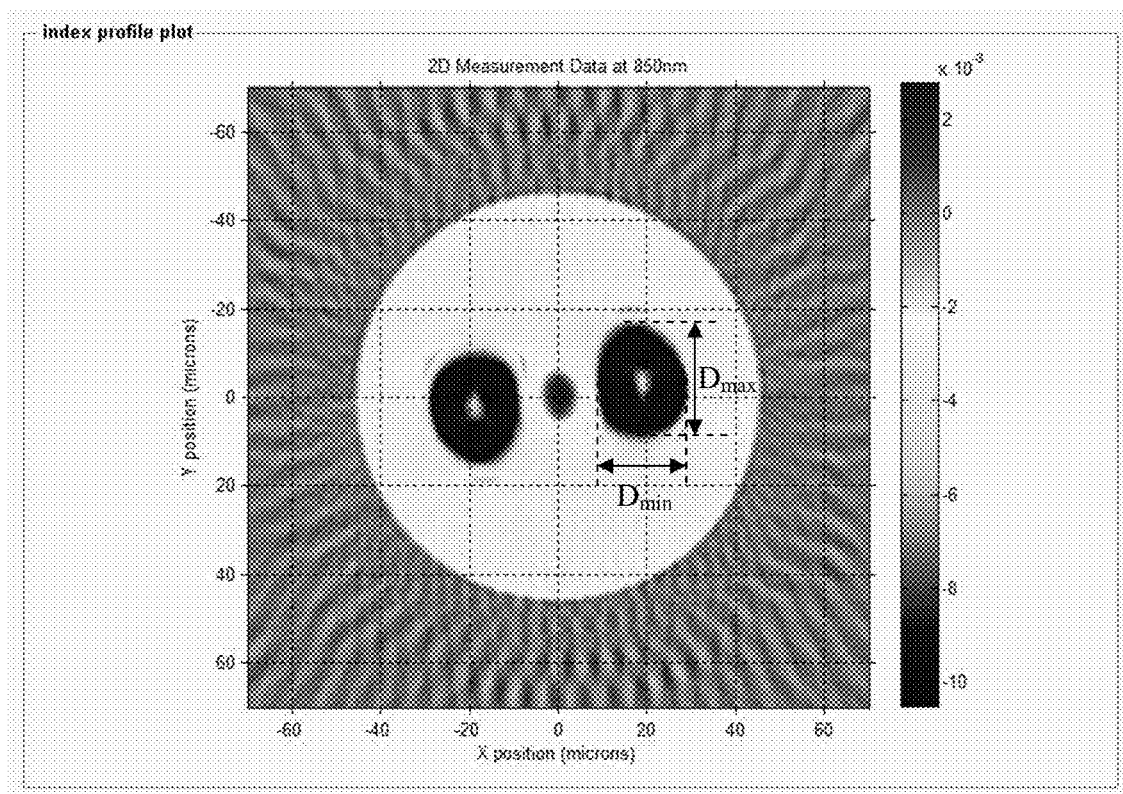
FIGS. 4A and 4B are cross-sectional views of measured 2-dimensional refractive index distributions of two embodiments of the single polarization optical fiber in accordance with the present invention.
Figure 4B:
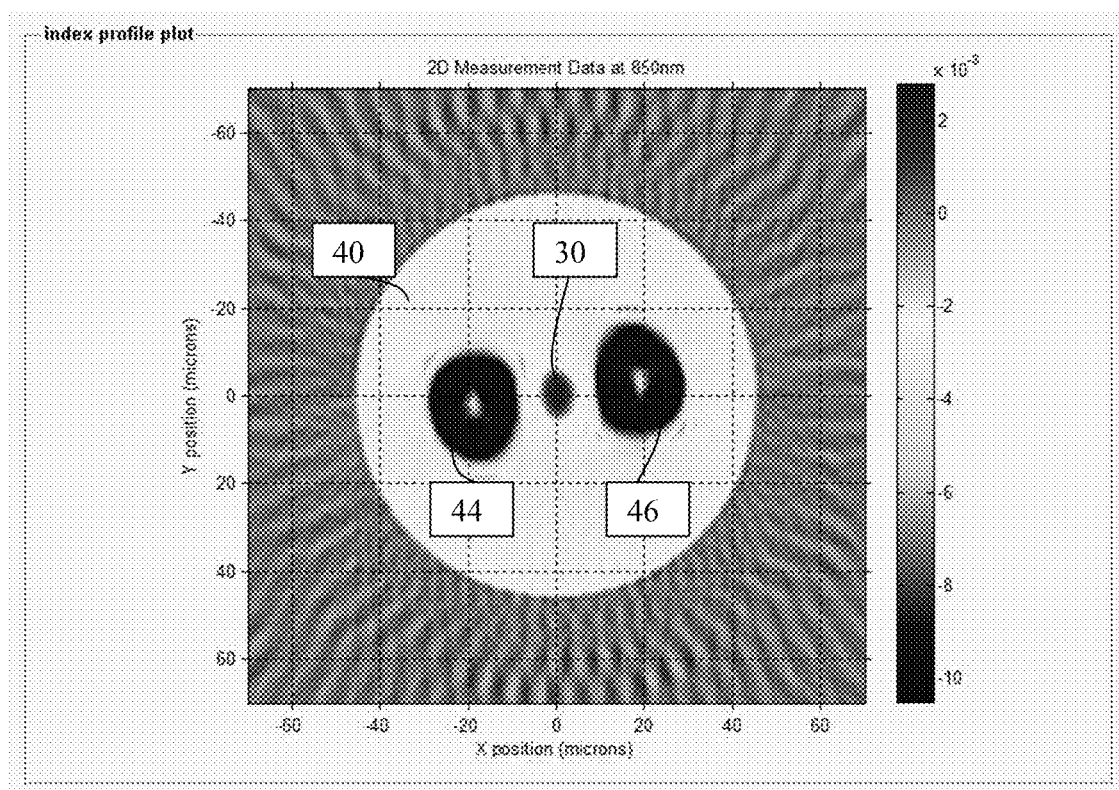

FIGS. 4A and 4B shows measured 2-D refractive index distributions for the two exemplary fiber embodiments (because these exemplary fibers are not circularly symmetric) manufactured by the above described exemplary method. More specifically these figures show cross-sectional areas of these fibers, with the grayscale bar on the right indicating the refractive index level. The maximal refractive index in the core is about $5 \times 10^{-3}$, which corresponds to a relative refractive index delta of 0.34% (relative to silica), and the minimal refractive index in the Fluorine stress rods is about $6.5 \times 10^{-3}$, which corresponds to a relative refractive index delta of 0.45% (relative to silica). For both fiber embodiments, the stress rods 44, 46 were deformed due to asymmetric stresses during the fiber draw and thus became non circular in cross-section. The core 30 becomes elliptical due to the asymmetrical mechanical stress from the fluorine doped stress rods. This elongated core increased further the birefringence of the optical fiber 20. Table 1 summarizes these fibers' parameters. The beat length $L_b$ of the fiber embodiment with the 125 μm outer cladding diameter is 1.66 mm, which is similar to the PM fiber with purely Boron stress rods (shown in FIG. 1). The fiber embodiment with the 100 μm outer cladding diameter has a longer beat-length than the 125 μm fiber.

TABLE 1

Measured optical parameter of the two PM fibers

| Outer cladding diameter | 125 μm diameter fiber | 100 μm diameter fiber |
| --- | --- | --- |
| Mode field diameter at 1310 nm (μm) | 10.2 | 9.1 |
| Mode field diameter at 1550 nm (μm) | 11.3 | 10.4 |
| 2 m cutoff wavelength (nm) | 1650 | 1208 |
| Cable cutoff wavelength (nm) | 1530 | 1080 |
| Beat-length $L_b$ (mm) | 1.66 | 18.66 |
| Birefringence | $9.3 \times 10^{-4}$ | $0.8 \times 10^{-4}$ |
| Attenuation at 1310 nm (dB/km) | 0.49 | 1.3 |
| Attenuation at 1550 nm (dB/km) | 0.49 | 1.9 |

The discovery of utilization of the mechanical-stress induced birefringence of PM optical fibers 20 with F doped stress member(s) 42 or rods 44, 46 to control polarization properties of optical fibers provides unique advantages, such as lack of thermal sensitivity during operation. While not wishing to be bound by theory, applicants believe that mechanism of mechanically-induced high-birefringence provided by F-doped silica stress-member(s) can be explained as follows:

The general birefringence (Bi) achieved in the PM fiber that uses stress members 42 (stress rods 44, 46) can be expressed as:

$$Bi = C \cdot (\sigma_t - \sigma_m), \quad (1)$$

where C is the stress-optical coefficient, $\sigma_t$ is the thermal-stress contribution, and $\sigma_m$ is the mechanical-stress contribution.

$$\sigma_t = \frac{2E\Delta\alpha\Delta T}{1-v} \quad (2)$$

and $$\sigma_m = -F/A, \quad (3)$$

where E is the Young's modulus, $\Delta\alpha$ the differential-CTE between the stress member(s) and the cladding, $\Delta T$ temperature difference between fiber strain temperature and the room temperature, v is Poisson's ratio, F is the fiber-drawing force, and A is the area of the stress member(s). The negative sign represents that the stress rods are in compression and the cladding of the fiber is in tension, which is the case of pure silica cladding. When silica glass is doped with other materials, both the refractive index and the coefficient of thermal expansion will change. For Fluorine dopant, delta is related to the weight percent ($W_F$) by the following equations, $$\Delta_F = -0.278 \times W_F \quad (4)$$

The index change for Fluorine doped glass is negative, which is suitable for stress rod application because it does not create a waveguide. The CTE α in the unit of 1/° C. is related to the molar percent by the following equation for the Fluorine doped silica, $$\alpha_F(M_F) = \alpha_{Silica} - 2.337 \times 10^{-7} W_F \quad (5)$$

The CTE of Fluorine doped glass decreases slightly, which creates a small compressive stress in the stress rod region. Because the thermal stress is low, the preforms with Fluorine doped rods and less than 1 wt % of boron are easy to handle during the preform manufacturing process when they are heated up or cooled down. The fluorine doped stress rods less than 1 wt % of boron (and preferably less than 0.5% wt % boron, more preferably with less than 0.1% wt % boron, more preferably with less than 0.02 wt % of boron, and even more preferably 0 wt % to 0.01 wt % boron) with lower viscosity than the silica cladding. When the preform is drawn into fiber, the draw tension is mostly taken by the silica cladding which results in tension in the fiber cladding and compression in the stress rods. The draw induced compression adds to the compression due to thermal expansion. Eq. (3) shows that the draw induced stress in the stress rods depends on the draw tension. To have high stress level in the stress rods, high draw tension is required. Preferably the draw tension is greater than 100 g, more preferably greater than 200 g, and even more preferably greater than 300 g. The draw induced mechanical stress is inversely proportional to the area of the stress rods. However, the birefringence induced in the core depends on the stress field inside the core, so there is an optimum diameter range for the stress rods. To increase the stress in the Fluorine doped stress rods 44, 46 while achieving minimum fiber attenuation high Fluorine doping level and very low amount of boron (and preferably no boron) is required to lower the viscosity of the rod's glass. Preferably the amount of Fluorine is greater than 1 wt %, more preferably greater than 2 wt %. Preferably the amount of boron (B) is less than 1 wt %, more preferably less than 0.5 wt %, even more preferable not greater than 0.1 wt % (e.g., (0.01 wt % or less).

In conventional PM fibers with high-B-doped-silica as the stress member(s) such as those shown in FIG. 1, the thermal-term, $\sigma_t$, is the dominant factor contributing to the birefringence Bi. The thermal-stress term $\sigma_t$ is driven largely by a large differential-CTE, $\Delta\alpha$. In fibers according to the exemplary embodiments herein, the mechanical-term, $\sigma_m$, is comparatively small and generally can be ignored. That is, in conventional PM fibers $\sigma_t \gg \sigma_m$ (e.g., $\sigma_t$ is at least 10 times larger than $\sigma_m$). In contrast, when the F-doped-silica with low amount of B (less than 1 wt %, preferably <0.1 wt %), or more preferably with essentially no B is used as the stress member(s) 42, 44, 46 in the optical fibers 20, the differential-CTE, $\Delta\alpha$, becomes small (almost nothing) and thus PM fibers 20 satisfy $\sigma_t \ll \sigma_m$ (e.g., $\sigma_t$ is at least 10 times smaller than $\sigma_m$). In some embodiments, such F-doped-silica stress member(s) of optical fiber 20 has/have a CTE of about $2 \times 10^{-7}/°$ C. to $5 \times 10^{-7}/°$ C., as calculated from Equation 5, which is very similar to that of pure-silica glass. (CTE of silica is about $5.5 \times 10^{-7}/°$ C.) Thus, the dominate force for the birefringence, Bi, as shown in equation (1), in the exemplary embodiments of the optical fibers 20 disclosed herein is almost totally the mechanical term, $\sigma_m$. The insensitivity of the $\sigma_m$ to temperature, as shown in equation (3), is consequently responsible for the thermal-stability of the PM fiber made by using F-doped-silica stress member(s). According to some embodiments $\sigma_t \ll \sigma_m$ (e.g., $\sigma_t < 0.10 \sigma_m$, or even $\sigma_t < 0.05 \sigma_m$) results in thermally-insensitive operation of the optical fiber 20. In some embodiments $0 \leq \sigma_t < 0.05\sigma_m$. Applicants realized that the boron, when present in the stress rods situated close to the fiber core, increases attenuation of the fiber (i.e., it increases the light loss due to the absorption of light by B present in the glass, so reducing the amount of B in stress rods below 1 wt %, or preferably eliminating it all together enables us to make low attenuation fibers. This reduction in B concentration allows us, without an increase in attenuation, to place the stress rods adjacent to, or close to the fiber core which increases birefringence and provides better polarization maintenance. In addition, boron, when present in glass, increases glass's thermal expansion coefficient (CTE), which increases the fiber's sensitivity to temperature changes. We discovered that by keeping the amount of B below 1%, and preferably less than 0.1%, or by not having B in the stress members or stress rods, improved the thermal stability of the PM fibers 20 described herein over a large temperature range (e.g., 100° C. to 600° C.).

A fiber cladding 40 preferably has a conventional outer diameter of about 125 microns or more and has a composition of preferably substantially pure silica. Optionally, the cladding 40 may include other suitable dopants, and the outer diameter may be reduced, if size constraints so dictate. The optical fiber 20 preferably exhibits attenuation of less than 2 dB/km at operating wavelength (e.g., at 1550 nm, or at 1310 nm).

In some embodiments the optical fiber 20 exhibits attenuation of less than 0.5 dB/km at operating wavelength (e.g., at 1550 nm, or at 1310 nm). According to some embodiments the optical fiber 20 exhibits birefringence of $0.4 \times 10^{-4}$ to $10 \times 10^{-4}$ at a wavelength of 450 nm to 1600 nm. According to some embodiments the stress rods comprise 1.5 wt %<F<3.5 wt %. According to some embodiments the stress member 42 or stress rod(s) 44, 46 have a cross-section with an average diameter $d_{av}$, wherein 10 µm≤$d_{av}$≤40 µm. According to some embodiments the stress rods has/have CTE of $2 \times 10^{-7}$/° C. to $5 \times 10^{-7}$/° C. within temperatures of −100° C. to 600° C. Preferably, the stress member or stress rods has/have less than 0.01 wt % B. In these embodiments $0 \leq \sigma_t < 0.1\sigma_m$. In some embodiments, $0 \leq \sigma_t < 0.05\sigma_m$.

It will be apparent to those skilled in the art that variations and modifications can be made to the present invention without departing from the scope of the invention. Thus, it is intended that the present invention cover the modifications and variations of this invention provided they come within the scope of the appended claims and their equivalents.

What is claimed is:

1. A polarization maintaining optical fiber comprising:
   (i) a core;
   (ii) a cladding surrounding the core; and
   (iii) at least one stress member adjacent the core and situated within the cladding, all of said at least one stress members comprising fluorine (F) doped silica with no boron (B); such that all of the at least one stress members have a CTE of $2 \times 10^{-7}$/° C. to $5 \times 10^{-7}$/° C. within temperatures of −100° C. to 600° C.

2. The polarization maintaining optical fiber of claim 1, wherein the core is silica based and is surrounded by at least one stress member, said at least one stress member being an annular region of F doped silica.

3. The polarization maintaining optical fiber of claim 1, wherein said at least one stress member includes at least two stress rods situated on opposite sides of said core.

4. The polarization maintaining optical fiber of claim 1 comprising an attenuation of less than 2 dB/km at an operating wavelength between 800 nm and 1600 nm.

5. The polarization maintaining optical fiber of claim 1 comprising an attenuation of less than 0.5 dB/km at an operating wavelength between 800 nm and 1600 nm.

6. The polarization maintaining optical fiber of claim 1, said fiber being a single mode polarization maintaining fiber and comprising a birefringence of $0.4 \times 10^{-4}$ to $10 \times 10^{-4}$ at a wavelength λ situated between 450 nm and 1600 nm.

7. The polarization maintaining optical fiber of claim 1, wherein said at least one stress member has 1.5 wt %<F<3.5 wt %.

8. The polarization maintaining optical fiber of claim 3, wherein said at least two stress rods have a cross-section with an average diameter $d_{av}$, wherein 10 µm≤$d_{av}$≤40 µm.

9. The polarization maintaining optical fiber of claim 1, said fiber being a single mode polarization maintaining fiber, wherein said at least one stress member comprises two F doped silica rods with 1.5 wt %<F<3.5 wt % and 0 wt % of B.

10. The polarization maintaining optical fiber of claim 1, said fiber being a single mode polarization fiber, wherein said at least one stress member comprises two F doped silica rods with no B.

11. The polarization maintaining optical fiber of claim 1, wherein said at least one stress member has a thermal stress coefficient $\sigma_t$ and a mechanical stress coefficient $\sigma_m$, and wherein $\sigma_t < 0.05\sigma_m$.

12. The polarization maintaining optical fiber of claim 1, wherein the optical fiber has a change in beat length $L_b$ of less than 10%.

13. The polarization maintaining optical fiber of claim 1, wherein the cladding has a CTE, and a differential-CTE, Δα, between the CTE of all of the at least one stress members and the CTE of the cladding is sufficiently small that a thermal-stress contribution, $\sigma_t$, to birefringence, Bi, of the optical fiber is smaller than a mechanical-stress contribution, $\sigma_m$, to Bi, Bi being expressed as Bi=C($\sigma_t - \sigma_m$), wherein C is the stress-optical coefficient.

14. The polarization maintaining optical fiber of claim 13, wherein $\sigma_t < 0.10\sigma_m$.

15. The polarization maintaining optical fiber of claim 1, wherein the cladding has a composition of substantially pure silica.

16. A polarization maintaining optical fiber comprising:
   (i) a core;
   (ii) a cladding surrounding the core; and
   (iii) at least one stress member adjacent the core and situated within the cladding, all of said at least one stress members comprising silica doped with fluorine (F) and no boron (B), wherein all of said at least one stress members have a thermal stress coefficient $\sigma_t$ and a mechanical stress coefficient $\sigma_m$, and wherein $\sigma_t < 0.1\sigma_m$, and a CTE of all of said at least one stress members is $2 \times 10^{-7}$/° C. and $5 \times 10^{-7}$/° C. within temperatures of −100° C. to 600° C.

17. The polarization maintaining optical fiber of claim 16, wherein the core is silica based and the at least one stress member comprises 1 wt % to 4 wt % F.

18. The polarization maintaining optical fiber of claim 16, wherein the core is silica based and the at least one stress member either: (i) includes at least two stress rods situated on opposite sides of said core; or (ii) surrounds said core.

19. The polarization maintaining optical fiber of claim 16, wherein said core is silica based; and the stress member includes at least two stress rods situated on opposite sides of said core, and said stress rods comprise 1 wt %<F<4 wt %.

* * * * *

UNITED STATES PATENT AND TRADEMARK OFFICE
CERTIFICATE OF CORRECTION

PATENT NO. : 10,838,140 B2
APPLICATION NO. : 15/071505
DATED : November 17, 2020
INVENTOR(S) : Ming-Jun Li et al.

It is certified that error appears in the above-identified patent and that said Letters Patent is hereby corrected as shown below:

In the Claims

In Column 9, Line 59, Claim 2, delete "surrounded by at least" and insert -- surrounded by said at least --, therefor.

In Column 10, Line 53, Claim 16, delete "and" and insert -- to --, therefor.

Signed and Sealed this
Twenty-ninth Day of November, 2022

Katherine Kelly Vidal
*Director of the United States Patent and Trademark Office*